B. W. FRANKLIN.
Vulcanizing Apparatus.
No. { 2,460, 33,464. }
Patented Oct. 8, 1861.
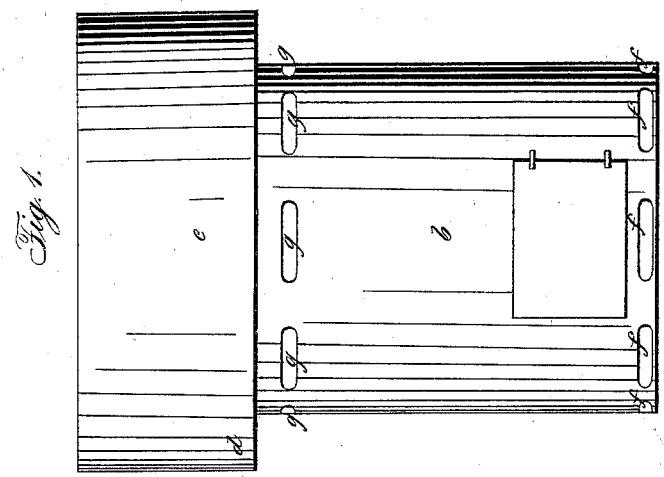
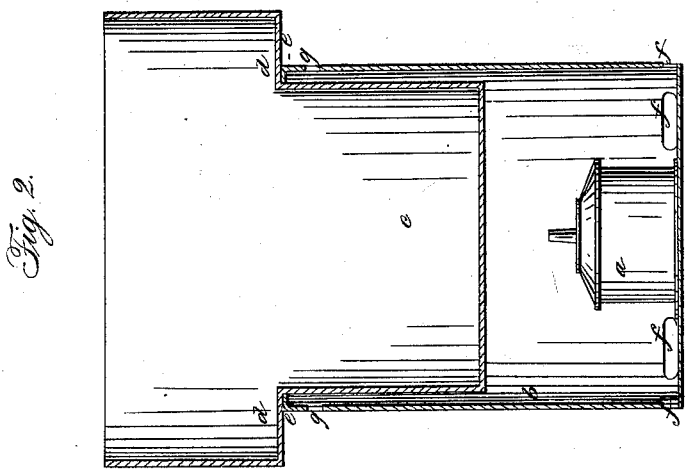
Witnesses:
Andrew de Lay
Wm H Nichols
Inventor:
Bradley W. Franklin
AM. PHOTO-LITHO. CO. N.Y. (OSBORNE'S PROCESS.)

UNITED STATES PATENT OFFICE.

BRADLEY W. FRANKLIN, OF NEW YORK, N. Y., ASSIGNOR TO THE AMERICAN HARD RUBBER COMPANY.

VULCANIZING CAOUTCHOUC.

Specification forming part of Letters Patent No. 33,464, dated October 8, 1861.

*To all whom it may concern:*

Be it known that I, BRADLEY W. FRANKLIN, of the city, county, and State of New York, have invented a new and useful Improvement in the Process of Vulcanizing the Hard Compound of India-Rubber and other Vulcanizable Gums; and I do hereby declare that the following is a full, clear, and exact description thereof, reference being had to the accompanying drawings, making part of this specification, in which—

Figure 1 is an elevation, and Fig. 2 a vertical section, of an apparatus suitable for the purpose of working my said process.

The same letters indicate like parts in both figures.

In vulcanizing india-rubber and other vulcanizable gums it has been the practice to subject the compound of gum and sulphur to the required high degree of heat in water in a vessel termed a "heater," which must be closed steam-tight to admit of raising the temperature to the high degree required for vulcanizing, as the degree of heat required for this purpose is far above the boiling-point of water in an open vessel. For vulcanizing various articles, particularly when made of what is known as the "hard compound," it would be very desirable to examine the progress of the vulcanization; but with the water or steam heater this could not done without too much labor in opening and reclosing the heater and waste of fuel to restore the temperature, which would be greatly reduced by opening the heater. To avoid the objections consequent upon the use of the steam or water heater, various attempts have been made to vulcanize in baths of melted metals and alloys of metals, but these have been found seriously objectionable, particularly on account of the expense and the tendency to attach to the molds in which the compound of gum is held. By my invention I avoid all the objections which have been experienced in the use of the steam or water heaters or metal baths, and at the same time I have found that articles of lighter or brighter colors can be produced by vulcanizing on my improved plan than can be produced by the modes heretofore used or tried.

My said invention consists in subjecting the compounds of india-rubber or other vulcanizable gums to the required vulcanizing heat in a bath of melted wax or equivalent substance, which melts or remains fluid at or about the temperature required for vulcanizing.

My said invention was intended chiefly for vulcanizing plates for dental purposes, although it is equally applicable to the vulcanizing of other articles, and the apparatus which I have employed for this purpose is represented in the accompanying drawings, in which—

$a$ is a spirit lamp in the bottom of a cylindrical vessel $b$, used in a vertical position. Within this vessel is placed an open pan $c$ for containing the required bath. This vessel is formed with the upper part $d$ to rest on the upper edge $e$ of the vessel $b$, the said vessel $b$ being pierced with holes $f$ near the bottom, other holes $g$ near the top for draft to the spirit-lamp. The bath-pan $c$ may be provided, if desired, with a loose cover; but this is not essential.

The required quantity of beeswax is put into the pan $c$ and melted by the flame from the spirit-lamp below, and when melted the articles to be vulcanized, previously inclosed in molds or enveloped in flexible sheets of metal or other suitable substance for protection against the action of the melted wax or its equivalent, are immersed in the liquid wax and there exposed to the degree of heat and for the length of time required.

As wax can be heated to the required temperature in an open vessel, there is no necessity for closing up the pan, so that the attendant can have ready and free access for inspection to the articles under treatment, the vulcanizing heat will be applied more equally, and the cost and danger attendant on the use of a steam or water heater, such as required to resist the high pressure unavoidably produced in heating water to the temperature required for vulcanizing, are avoided, and it will be found that this greatly facilitates the production of articles of either brighter or more delicate colors than by any other known plan, as I have succeeded in producing articles of a delicate and bright pink color, a result which cannot be obtained by vulcanizing either in the water or steam heater. Although I have described and represented the apparatus which I have used for this purpose, I do not wish to be understood as limiting myself to the use thereof, as this makes no part of my invention. Although I prefer to use beeswax for the bath, I do not wish to limit my claim of invention thereto, as oil, rosin, and other like substances may be used; but while oil and rosin are readily heated to the required temperature they are not so desirable for the purpose as beeswax, as oil has a tendency to dissolve the india-rubber before it becomes vulcanized, and for that reason requires much care in inclosing the articles to be vulcanized in the molds or other envelope to insure the exclusion of the oil or other fatty substance, and rosins when exposed to heat in the melted state form tar; but any equivalent substance may be substituted for wax, which in the liquid state can be maintained in an open vessel at the degree of heat required for vulcanizing other than metals or their alloys, and which will not unite with the molds usually employed for the purpose.

What I claim as my invention as an improvement on the well-known Goodyear process of vulcanization is—

The employment of a bath of wax or equivalent substance as a medium for applying the vulcanizing heat to the vulcanizing compounds of india-rubber and other vulcanizable gums, substantially as and for the purpose specified.

BRADLEY W. FRANKLIN.

Witness:
 ANDREW DE LACY.